United States Patent
Karl

(10) Patent No.: US 11,924,725 B2
(45) Date of Patent: Mar. 5, 2024

(54) METHOD FOR COMMUNICATION BETWEEN AT LEAST TWO VEHICLES TRAVELLING IN SUCCESSION, AND VEHICLE HAVING AT LEAST ONE COMMUNICATION APPARATUS

(71) Applicant: Robert Bosch GmbH, Stuttgart (DE)

(72) Inventor: Matthias Karl, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 17/405,614

(22) Filed: Aug. 18, 2021

(65) Prior Publication Data
US 2022/0060870 A1   Feb. 24, 2022

(30) Foreign Application Priority Data
Aug. 20, 2020   (DE) .................. 10 2020 210 616.9

(51) Int. Cl.
H04W 4/46   (2018.01)
H04B 11/00   (2006.01)
H04W 76/16   (2018.01)

(52) U.S. Cl.
CPC .............. H04W 4/46 (2018.02); H04B 11/00 (2013.01); H04W 76/16 (2018.02)

(58) Field of Classification Search
CPC ..... H04W 4/46; H04W 76/16; H04W 64/006; H04B 13/00; H04B 7/155; H04B 10/11; H04B 11/00; G08C 17/02; G08C 1/096; G08G 1/22; G08G 1/16; G08G 1/161;
(Continued)

(56) References Cited

U.S. PATENT DOCUMENTS

| | | | |
|---|---|---|---|
| 6,239,738 B1 * | 5/2001 | Wanielik | G01S 13/931 342/99 |
| 9,076,341 B2 * | 7/2015 | Funabashi | G08G 1/22 |
| 9,202,379 B2 * | 12/2015 | Yamashiro | G08G 1/22 |

(Continued)

FOREIGN PATENT DOCUMENTS

| | | |
|---|---|---|
| DE | 19600059 A1 | 7/1997 |
| DE | 10024739 A1 | 12/2000 |

(Continued)

OTHER PUBLICATIONS

Wikipedia, "Domino Effect", <https://de.wikipedia.org/wiki/Dominoeffekt>, last edited Jun. 13, 2020 (4 pages).

*Primary Examiner* — Man U Phan
(74) *Attorney, Agent, or Firm* — Michael Best & Friedrich LLP

(57) ABSTRACT

A method for communication between and/or determination of the movement of at least two vehicles 2a, b, c travelling in succession by means of a communication arrangement 4, wherein the communication arrangement 4 has at least one first communication apparatus 3a for arrangement on a first vehicle 2a and at least one second communication apparatus 3b for arrangement on a second vehicle 2b, is proposed, in which a signal is transmitted via a transmission path between the communication apparatuses 3a, b, c, wherein a main transmission link H of the transmission path runs at least beneath the first and/or second vehicle 2a, b and/or in which the determination of movement is carried out on the basis of the propagation time and/or propagation time differences.

14 Claims, 3 Drawing Sheets

(58) Field of Classification Search
CPC ........ G01S 13/93; G01S 13/91; G01S 13/931; G01S 13/34
USPC .......................................................... 370/329
See application file for complete search history.

(56) References Cited

U.S. PATENT DOCUMENTS

| | | | | |
|---|---|---|---|---|
| 9,214,086 | B1* | 12/2015 | Onishi | G08G 1/096716 |
| 9,478,087 | B2* | 10/2016 | Proefke | G07C 9/00309 |
| 9,779,628 | B2* | 10/2017 | Yamashiro | G08G 1/22 |
| 9,827,987 | B2* | 11/2017 | Reich | B60W 10/10 |
| 10,554,521 | B1* | 2/2020 | Terechko | H04L 43/0835 |
| 10,684,352 | B2* | 6/2020 | El Assaad | G01S 5/0289 |
| 10,790,927 | B2* | 9/2020 | Alieiev | H04L 1/0003 |
| 10,824,152 | B2* | 11/2020 | Badolato Martin | G05D 1/0212 |
| 11,027,776 | B2* | 6/2021 | Lee | B60W 40/064 |
| 11,036,370 | B2* | 6/2021 | Adenwala | G06F 3/0481 |
| 11,054,514 | B2* | 7/2021 | Mitchell | E05F 15/73 |
| 11,145,142 | B2* | 10/2021 | Chainer | B62D 15/025 |
| 11,225,153 | B2* | 1/2022 | Prasad | H04N 23/61 |
| 11,305,777 | B2* | 4/2022 | Batts | B60W 30/09 |
| 2013/0211624 | A1* | 8/2013 | Lind | G05D 1/0278 701/2 |
| 2019/0079540 | A1* | 3/2019 | Yoon | G05D 1/0293 |
| 2019/0279512 | A1* | 9/2019 | Daniel | B60W 30/09 |
| 2020/0410868 | A1* | 12/2020 | Bouillon | B60W 60/001 |
| 2021/0096224 | A1* | 4/2021 | Lee | G01S 17/42 |
| 2022/0089157 | A1* | 3/2022 | Ito | B60W 10/04 |
| 2022/0126870 | A1* | 4/2022 | Shi | B60W 10/18 |
| 2022/0262257 | A1* | 8/2022 | Franchi | B60W 30/143 |
| 2022/0287083 | A1* | 9/2022 | Gomes Baltar | H04W 74/0808 |

FOREIGN PATENT DOCUMENTS

| | | |
|---|---|---|
| DE | 102014002116 A1 | 8/2015 |
| DE | 102017222216 B3 | 5/2019 |

* cited by examiner

METHOD FOR COMMUNICATION BETWEEN AT LEAST TWO VEHICLES TRAVELLING IN SUCCESSION, AND VEHICLE HAVING AT LEAST ONE COMMUNICATION APPARATUS

BACKGROUND OF THE INVENTION

The invention relates to a method for communication between at least two vehicles travelling in succession. Furthermore, the invention relates to a vehicle having at least one communication apparatus.

Driver assistance systems are known that are used to support or automate a driving function of a vehicle. By way of example, the driver assistance system can maintain a predetermined speed of the vehicle and in so doing not get closer than a predetermined minimum distance from a vehicle travelling ahead. In order to allow data to be interchanged between the vehicles, so-called vehicle-to-vehicle communication apparatuses (V2V) are used to coordinate the driving behaviors.

The document DE 10024739 A1 discloses a convoy driving control apparatus that permits travel in a convoy with a lead vehicle and at least one following vehicle automatically following the lead vehicle, wherein a vehicle has an apparatus to transmit a request to the lead vehicle to separate from or join the convoy. The lead vehicle has an apparatus to permit or reject the request from the one vehicle, wherein, if the lead vehicle permits the request, the one vehicle is switched by a mode switching apparatus between automatic driving, in which the following vehicle automatically follows the lead vehicle, and manual driving by a driver.

SUMMARY OF THE INVENTION

The present invention relates to a method for communication between at least two vehicles travelling in succession. Furthermore, the method is designed to determine the movement of these vehicles, in particular the distances from one another or the changes in said distances over time. In addition, the method is designed to combine communication and determination of movement. The present invention is used in particular to realize a predetermined movement behavior and in particular a distance between the vehicles. Furthermore, the invention relates to a vehicle having a communication apparatus that can likewise be used for determining movement. Further advantages, effects and embodiments emerge from the subclaims, the description and the accompanying figures.

The invention involves a method for communication between at least or precisely two vehicles travelling in succession being proposed, which method can be implemented by means of a communication arrangement. The communication arrangement has at least or precisely two communication apparatuses. In particular, the communication arrangement is in the form of a convoy driving control system, wherein one of the vehicles forms a lead vehicle and at least one vehicle automatically following the lead vehicle forms a following vehicle. The communication arrangement preferably comprises a separate communication apparatus for each of the vehicles in the convoy. Preferably, the communication apparatuses are each in the form of so-called vehicle-to-vehicle communication apparatuses.

At least a first communication apparatus is arranged and/or arrangeable on a first vehicle and a second communication apparatus is arranged or arrangeable on a second vehicle. Optionally, any number of other vehicles can each be equipped with at least one other communication apparatus. The communication apparatuses are each designed to send at least or precisely one vehicle parameter of the associated vehicle to a vehicle that is following and/or to receive the vehicle parameter of a vehicle travelling ahead. The vehicles in the convoy preferably each have a control device, in particular a vehicle-to-vehicle control device, which is designed to control the respective vehicle on the basis of the at least one received vehicle parameter. In particular, the at least one vehicle parameter can be transported wirelessly between the communication apparatuses by at least one signal. Preferably, the at least one signal is transmitted between the communication apparatuses electrically and/or magnetically and/or optically and/or acoustically.

The invention involves the signal being transmitted via a transmission path between the first and the second communication apparatus, wherein a main transmission link of the transmission path runs beneath the first and/or second vehicle. In particular, the main transmission link is defined in that a signal transmission between the communication apparatuses takes place for the most part and/or without interruption via the main transmission link. In particular, the first and/or the second communication apparatus is arranged on an underside of the respective vehicle, which means that the main transmission link between respectively adjacent communication apparatuses runs for the most part or exclusively beneath the vehicles. The transmission path can comprise multiple transmission links, in particular a main transmission link and one or more secondary transmission links. It is conceivable for no signal reflections or signal reflections only from the first and/or the second vehicle and/or from a surface beneath the vehicles to occur when a signal is transmitted from a first vehicle to a second vehicle along the main transmission link. It is further conceivable for signal reflections also from at least one vehicle that is different from the first and the second vehicle and/or from an area of vehicle surroundings of the first and/or the second vehicle that is different from the surface beneath to occur when a signal is transmitted from a first vehicle to a second vehicle along a secondary transmission link.

The advantage of the invention is that a method is proposed that is distinguished by reliable signal transmission and therefore improved vehicle-to-vehicle communication. In particular, the vacant cavity formed beneath the vehicle can advantageously be used to transmit the signal according to the principle of a waveguide, which is known from radio-frequency engineering. In addition, a transmission path is proposed that is distinguished by interference-free or at least reduced-interference transmission of the signal.

According to the invention, it has been recognized that, as a consequence of so-called autonomous driving, it is necessary to keep a proportionally very great minimum distance from adjacent road users because the autonomously (Greek: by itself, independently) driving vehicle has no or at most rudimentary prior knowledge of the future movement behavior of adjacent road users. In order to compensate for this lack of information, autonomously driving vehicles need to keep an enormously greater safety distance from adjacent road users so that the uncertainty about the future movement behavior thereof is compensated for by virtue of sufficient free space being kept available in order to be able to check the driving behavior of adjacent vehicles.

By contrast, a vehicle to be controlled should, during coordinated driving, already know the information about the future behavior of its road users adjacent to it before the behavior thereof can be gauged. The closer the coordination, the more precisely the predetermined minimum distance can be kept during coordinated driving. As the distance between successive vehicles becomes shorter, not only does the energy consumption of the vehicles fall and not only is the traffic area utilized more effectively, but there is also a reduced probability of other vehicles cutting in between the vehicles that are driving in a coordinated manner. The aim in this case is for the vehicles that are coordinated with one another using electronics to behave toward one another, as far as possible, as if there were a mechanical drawbar between them, which is why this driving is also referred to as electronic drawbar in German, or platooning in English. An electronic drawbar should allow the distance between the vehicles, for example at a speed of 80 km/h, to always be kept reliably constant at less than 20 m and in particular significantly less than 10 m.

This firstly requires in particular the information about the movement behavior of the at least one vehicle travelling ahead to be transmitted to the vehicles following said vehicle with extremely high reliability and with negligible delay, and secondly the vehicles that are following should in particular always be able to check with an extremely high level of precision whether the vehicles travelling in a coordinated manner are actually moving according to the information interchanged about their respective movement behavior. The more precisely just extremely small fluctuations or deviations in the movement behavior with respect to one another can be detected and corrected as promptly as possible, the more accurately it is possible to keep the distance between the vehicles. Ideally, the "length" of the electronic drawbar e.g. at 80 km/h can thus be shortened to 5 m and less.

First and foremost, road traffic regulations dictate that in this case the movement information of the vehicle travelling directly ahead is influential for a vehicle that is following. In order to avoid the disadvantages of a domino effect [https://de.wikipedia.org/wiki/Dominoeffekt] owing to the information processing in a vehicle travelling ahead, however, it is furthermore desirable for at least some information from the at least one vehicle travelling in front of the vehicle travelling ahead to possibly also be received directly with lower reliability.

Alternatively, the vehicle situated in between can receive the information on its one side and transmit it again on its other side in unaltered form and/or after information processing, as a result of which the at least one vehicle situated in between appears permeable or transparent for the information that is to be transmitted.

Secondly, movement information from vehicles that are following should, as far as possible, also be available to those travelling ahead, for example in order to organize sharp collective braking such that the distances between the vehicles vary as little as possible.

In one specific embodiment of the invention, there is provision for the first and the second communication apparatus to have a transmission area, wherein the signal is transmitted and/or received within the transmission area. In this case, at least or exactly 50% of the transmission area of the first and/or the second communication apparatus is arranged beneath the associated vehicle. Preferably, more than 60%, preferably more than 80%, specifically more than 95%, of the transmission area of the first and/or second communication apparatus is arranged beneath the associated vehicle. In particular, the transmission area of the first and/or the second communication apparatus has a directional characteristic, the main direction of which is directed beneath the associated vehicle and/or in the longitudinal direction of the associated vehicle. A communication arrangement is therefore proposed whose signal strength and/or transmission quality between the individual vehicles is improved.

In another specification, there is provision for the main transmission link to run at least approximately in the longitudinal direction of the first and/or the second vehicle. In particular, the communication apparatuses are arranged on the respective vehicle such that the main transmission link between two vehicles travelling in succession runs substantially in the vehicle longitudinal direction. Preferably, the main transmission link in the longitudinal direction from one to the other vehicle runs substantially on the vehicle underside. A transmission path is therefore proposed that allows a direct signal transmission between the individual vehicles in the longitudinal direction, or the direction of travel.

In another implementation, there is provision for the signal to be reflected along the main transmission link in a y direction with reference to a vehicle coordinate system by the vehicle wheels on both sides of the first and/or second vehicle. In particular, the vehicle is in the form of a motor vehicle having at least two axles, with two vehicle wheels per axle being mounted at each of the ends of the vehicle axle so as to move rotationally. In particular, the inner sides of the vehicle wheels, in particular the metal rims thereof, therefore serve as reflectors for the signal. Since, at higher speeds, the steering is usually turned only slightly, even steering usually has a beneficial effect on the signal propagation, because the signals are likewise deflected as a result of the steering turns of the vehicle wheels.

Alternatively or optionally additionally, the signal is reflected along the main transmission link in a z direction with reference to the vehicle coordinate system firstly by a driving surface, in particular the road, and secondly by an underbody of the vehicle. Particularly preferably, the main transmission link runs in an x direction with reference to the vehicle coordinate system beneath the vehicle axles and/or between the vehicle wheels. In particular, the x direction of the vehicle coordinate system is defined by the longitudinal direction of the vehicle, the x, y and z directions being defined as three direction vectors perpendicular to one another. The signal can therefore be reflected by the usually smooth driving surface, the vehicle underside and the inner sides of the rims according to the principle of a waveguide, which means that attenuation of the signal can be significantly reduced depending on medium, signal form and message content.

In another specification, there is provision for at least or precisely one of the communication apparatuses to have a surroundings detection module that takes the signal as a basis for detecting an object and/or a driving surface in the surroundings of the associated vehicle. In particular, the surroundings detection module is designed to take the received signals from a vehicle travelling ahead and/or to take the transmitted signals to a vehicle that is following as a basis for scanning surroundings of the vehicle. In particular, the object and/or the driving surface is identified by evaluating the signals reflected by the object or the driving surface. Preferably, the surroundings detection module is connected to the control apparatus of the vehicle for signalling purposes, the control apparatus being designed to take the detected surroundings as a basis for determining a driving strategy for the vehicle. By way of example, the surroundings detection module can take the signal as a basis for identifying a vehicle, person, animal or obstacle appearing in front of or behind the vehicle. By way of example, the surroundings detection module can take the signal as a basis for identifying a surface and/or a condition of the driving surface in the surroundings, in particular in front of the vehicle. The surroundings of the vehicle can be defined as an area of more than 5 meters, preferably more than 10 meters, specifically more than 50 meters, around the vehicle. A communication apparatus is therefore proposed that is distinguished by the additional function of surroundings detection.

In an alternatively or optionally additional development, there is provision for at least or precisely one of the communication apparatuses to have an underbody detection module that takes the signal as a basis for detecting an object and/or a driving surface in an underbody area of the associated vehicle. In particular, the underbody detection module is designed to take the received signals from a vehicle travelling ahead and/or to take the transmitted signals to a vehicle that is following as a basis for scanning the underbody area of the vehicle. In particular, the object and/or the driving surface is identified by evaluating the signals reflected by the object or the driving surface on the basis of signal changes that arise as a result of the presence of objects and/or changes in the driving surface. Besides signal changes that the transmitted signals experience as a result of reflection, the underbody detection module in particular also uses the signal changes for the objects that are present and/or changes in the driving surface along the signal propagation path from signal transmission through to signal reception physically separate therefrom. As such, for example the presence of an object can bring about the attenuation and/or delay or change of propagation time of a signal, for example with respect to a reference signal. Preferably, the underbody detection module is connected to the control apparatus of the vehicle for signalling purposes, the control apparatus being designed to take the detected underbody area as a basis for determining a driving strategy for the vehicle. By way of example, the underbody detection module, in particular before the vehicle is started up, can take the signal as a basis for identifying a person, animal, obstacle or the like that is under the vehicle. By way of example, the underbody detection module can take the signal as a basis for identifying a surface and/or a condition of the driving surface beneath the vehicle. The underbody area of the vehicle can be defined as an area, in particular the cavity beneath the vehicle, that is completely or at least partly concealed by the vehicle. A communication apparatus is therefore proposed that is distinguished by the additional function of underbody detection.

In another embodiment, to increase the reliability of the communication and/or the determination of the movement behavior, there is provision for at least the first communication apparatus to have a first and a second transmission module. In particular, the first transmission module is in the form of a transmitter for transmitting a first and optionally also a second signal to the second communication apparatus and/or in the form of a receiver for receiving a first and optionally also a second signal from the second communication apparatus. In particular, the second transmission module is in the form of a transmitter for transmitting a second and optionally also a first signal to the second communication apparatus and/or in the form of a receiver for receiving a second and optionally also a first signal from the second communication apparatus. The first signal is transmitted along the main transmission link between the first transmission module and the second communication apparatus, and the second signal is transmitted along the main transmission link between the second transmission module and the second communication apparatus. Furthermore, in a preferred case the transmission modules are optionally additionally capable of transmitting and/or receiving the respective other signals crosswise. In principle, the first and the second signal can be transmitted via the same transmission path. Alternatively, the first and the second signal can also be transmitted via two mutually separate and/or independent transmission paths, however, the main transmission link of the two transmission paths having the same or an identical characteristic. In particular, the first and the second transmission module are arranged spaced apart from one another by a stipulated and/or known distance. In a preferred manifestation, the at least two transmission modules of a first communication apparatus are spaced apart from one another at least to the extent that the propagation time differences compared to a transmission module of the second communication apparatus assume a measurable magnitude in the underlying scenarios. A person skilled in the art is aware that for this the distance between the at least two transmission modules of a communication apparatus should be at least greater than 20%, but preferably greater than 50%, in particular greater than 100%, of the shortest wavelength of the signal. Owing to the optionally additional crosswise transmission, other signal propagation paths are obtained along the main transmission link, as a result of which redundancy and hence reliability are obtained both for the communication of the adjacent vehicles and for the determination of movement. In particular, the first and the second signal are in the form of signals that can be distinguished from one another. Particularly preferably, the second communication apparatus has at least one other transmission module, the at least one other transmission module being designed to communicate with the first and/or the second transmission module.

In a first implementation, there is provision for the first signal to be transmitted by the first transmission module and for the second signal to be transmitted by the second transmission module, to the second communication apparatus, at proximate times, in particular at the same time, wherein the first and the second signal are distinguished from one another by means of a modulation method that allows separation of first and second signals arriving at a receiver almost at the same time. In particular, the first and the second signal are transmitted in a manner staggered with respect to one another by an interval of time, so to speak, of less than 10 ms, preferably less than 20 ms, specifically less than 1 ms. In particular, the first and the second transmission module are in the form of transmitters and the at least one other transmission module is in the form of a receiver. Specifically, the second communication apparatus has one receiving transmission module per transmitting transmission module.

In an alternative manifestation, multiple transmission modules of a receiving communication device are equipped to receive at least one signal from a transmitting transmission module and thus to increase the reliability of the communication and/or the determination of the movement behavior by means of redundancy.

In particular, the modulation method applied is a so-called orthogonal frequency division multiplexing (OFDM) method. To this end, the first and the second signal are organized such that they can be separated from one another by means of OFDM at the receiver, in particular by the second communication apparatus. The first and/or the second signal can convey information, in particular the vehicle parameters, as different pulse durations and/or different orthogonal frequency sets and/or different pulse positions to the second communication apparatus. Robust signal transmission of at least two different signals can therefore be realized.

Optionally, there is provision, in the case of OFDM transmissions, for the frequency offset within the pulses of the first and the second signal that are modulated with OFDM symbols to be fixed, wherein a Doppler shift shifts all the frequencies of the first or second signal at the same time, so that the second communication apparatus is provided with conveyance of a precise measure of the transmitter time base from the fixed frequency relationship and can estimate the Doppler shift from the shift in all the OFDM frequencies. Preferably, the frequency offset is known to the second communication apparatus in this regard, which means that the at least one transmission module thereof can determine the relative movement and in particular the relative speed from the frequency shift in all the frequencies of a received OFDM symbol, while it can use the propagation time to infer the distance and can use the propagation time shifts to infer the direction of the vehicles with respect to one another by means of trilateration and can use the frequency pattern of the transmitted OFDM symbol to infer the information communicated in the signal.

This embodiment is based on the consideration that the ability of receivers to separate signal elements that are at least intermittently received at the same time, such as e.g. OFDM pulses, is limited and therefore, in particular in the event of differences in the signal dynamics, can be stretched to these practical limits. In a second implementation, there is therefore provision for the first signal to be transmitted by the first transmission module and for the second signal to be transmitted by the second transmission module, to the second communication apparatus, as pulsed signal elements in a manner staggered with respect to one another by an interval of time in this way, wherein the first and the second signal are distinguished from one another by the second communication apparatus on the basis of the interval of time between the pulsed signal elements, because the signals were organized during transmission such that despite propagation time shifts that may arise for the first and the second signal in relation to one another the pulsed signal elements do not overlap in the at least one transmission module of the second communication apparatus at the receiver. In particular, the first and the second signal are made up of a series of pulsed signal elements. The information to be communicated in this case is modulated onto the pulsed signal elements by means of modulation methods with which a person skilled in the art is familiar. The first and/or the second signal can convey information to the second communication apparatus as different pulse durations and/or different (orthogonal) frequency sets, for example also as a chirp and/or OFDM symbol and/or frequency responses and/or different pulse positions. The interval of time, which should be selected during transmission, between the pulsed signal elements is dependent on the transmission medium used and the predominant propagation speed therein and should be selected such that the first and the second signal are received by the at least one receiving transmission module at staggered times in a respective stipulated angle range for the vehicles with respect to one another. Owing to these constraints during the signal transmission, the receiver-end demands on separation ability are reduced to the detriment of the amount of information that can be transmitted and/or to the detriment of the frequency of detection or to the detriment of the detection quality. A communication arrangement is therefore proposed in which the sophistication for separating signal elements of its own system that are received at the same time is dispensed with. In addition, a communication apparatus and/or apparatus for determining movement behavior is proposed in which the first and the second signal are clearly separable from one another by means of pulse pauses in the event of a signal change.

In another specific implementation, there is provision for a propagation time difference between the transmission and reception of the first and/or second signal to be taken as a basis for ascertaining a position and/or a direction of travel of the first vehicle relative to the second communication apparatus. In particular, the second communication apparatus is designed to determine the direction of travel of the first vehicle on the basis of the propagation time differences between the transmission, which is in particular known to the second communication apparatus, and reception of the first and second signals. In particular, the second communication apparatus is designed to determine the position of the first vehicle on the basis of the received first and second signals and the known distance between the first and the second transmission module. In particular, the first and second signals are transmitted and received in real time, which means that the control device of the respective vehicle can adapt to the driving conditions immediately. Specifically, the direction of communication between the first and the second communication apparatus can be occasionally turned round, so that the second communication apparatus is used to transmit and the first communication apparatus is used to receive. By way of example, the reversal of the direction of communication allows the position and/or direction of travel of the second vehicle relative to the first communication apparatus to be ascertained.

In another embodiment, it is possible for only one first or one second signal to be transmitted by only one transmission module of a communication device and received by a first and a second transmission module, spaced apart from one another, of another communication device. In this way too there is the possibility, by means of trilateration, of the relative position of one vehicle with respect to the other, as well as of communication by means of modulation of the first or the second signal with the information to be transmitted, although in this embodiment there is only transmission from one transmission module at any one time.

In particular in order to ensure reliable determination of the relative angular position of the vehicles with respect to one another by means of trilateration on the basis of propagation time differences by means of known propagation speed, in a preferred embodiment the at least one transmission module of one communication apparatus and the at least two transmission modules of the other communication apparatus use one and the same transmission medium, such as for example sound waves, electromagnetic waves, light, or flashes of light.

In another specific implementation, there is provision for the first signal to be transmitted using sound waves and for the second signal to be transmitted using electromagnetic waves. In particular, the first signal is transmitted using radio-frequency sound waves or ultrasonic waves. To this end, the first and the second communication apparatus, in particular at least one of the transmission modules, can be in the form of or comprise an ultrasonic sensor. In addition, the first and the second communication apparatus, in particular at least one of the transmission modules, can be in the form of or comprise a radar sensor, e.g. corner radar, for transmitting and receiving the electromagnetic waves. Specifically, there is provision for the transmission paths of the first and second signals (radio/sound) to be used at proximate times, in particular at the same time.

In another development, there is provision for the signal, in particular the first and/or the second signal, to be in the form of a chirp signal or in the form of an OFDM signal or the like.

In one development there is provision for the at least one signal to be synchronized by means of another medium. By way of example, the first and/or the second communication apparatus have an interface for near field communication, WLAN, mobile radio or the like, in order to synchronize the signal. A communication arrangement is therefore proposed that is distinguished by improved communication and/or by improved determination of the movement relationships. If for example the absolute propagation time of a signal from a transmission module of one communication apparatus to the two transmission modules, arranged at a known distance from one another, of the other communication apparatus is not known, the angular position of the vehicles with respect to one another can be indicated by a distance-dependent curve on the basis of propagation time differences that possibly arise. However, if another medium can be used to determine the transmission time beforehand and/or to convey the transmission time from one communication apparatus to the other communication apparatus, then this can be used, as a result of the time difference between transmission and reception, to determine the respective absolute propagation time and, by means of the known propagation speed, the length of the transmission path therefrom, and the propagation time difference or the transmission path difference in combination with the distance between the transmission modules of the other communication apparatus can be used, by means of trilateration, to determine the distance and the angle of the transmission modules and hence of the vehicles with respect to one another.

In another embodiment, there is provision for the signal, onto which information to be communicated is optionally impressed, to be transmitted by the first communication apparatus to the second communication apparatus and for the signal in unaltered or in modified form to be transmitted from the second communication apparatus back to the first communication apparatus after a stipulated time, wherein a total transmission time for the signal and the known propagation speed of the transmission medium are taken as a basis for ascertaining a distance between the first and the second communication apparatus. In particular, the first transmission module is in the form of a transmitter that at least intermittently transmits the signal to another receiver of the second communication apparatus. In particular, the second transmission module is in the form of a receiver that receives the signal from another transmitter of the second communication apparatus after the stipulated time. Preferably, one or more signals are transmitted to the other receiver of the second communication apparatus using the transmitter of the first communication apparatus with a finite propagation time, the other transmitter of the second communication apparatus transmitting one or more signals to the receiver of the first communication apparatus again after a known, stipulated time. Preferably, the communication arrangement, in particular the first communication apparatus, has an evaluation device that evaluates the received signal(s) and takes the total transmission time as a basis for ascertaining the distance between the first and the second communication apparatus or between the first and the second vehicle. In comparison with a signal transmitted by a communication apparatus being passively transmitted back by means of reflection from one of the surfaces of the vehicle with the other communication apparatus, it is possible to avoid interference, such as for example superimposed echoes, by stipulating a suitable time before the transmission back begins; a lower signal strength suffices for distance determination and/or it is also possible for greater distances to be determined in this way, and/or the signal used for determining the movement behavior moreover permits communication in both directions by impressing the respective information onto the signal(s) to be transmitted by the transmission modules. In principle, communication can take place in both directions using the same medium, e.g. using sound waves. Alternatively, however, communication can take place using one medium, e.g. sound waves, in one direction and using another medium, e.g. electromagnetic waves or light, in the other direction. Optionally, a repeated transmission, in particular a so-called repeated singaround, can be carried out between the two communication apparatuses prior to the evaluation by the evaluation device. As such, in a preferred case, an information-transmitting signal can be formed that is always transmitted again after a known stipulated time after it was received by a communication apparatus using a transmission module, this signal preferably containing other fixed information, such as for example identifications of the communication apparatuses or transmission modules involved and for example variable information such as for example a continuously counting lap counter for identifying the number of renewed transmissions. A communication apparatus is therefore proposed that is distinguished by the additional function of distance measurement. An advantage of the system and method described is that convoy travel by multiple vehicles is made possible in which there can predominantly be a very short distance between the vehicles.

The proposed method takes account of the high demands on the reliability of information transmission and on the ability to promptly check (inspect) the transmitted information during coordinated driving at short distance by using the exchanged signals both to communicate information redundantly and to be able to determine the movement behavior of road users and in particular of the vehicles travelling in a manner coordinated with one another in a variety of ways. The high reliability demands can be taken into account in this case in particular by means of redundancy during the communication and/or movement monitoring. As a result of the transmission modules of the communication apparatuses being arranged at a specific distance from one another, it is possible to define a fine-meshed network of paired transmission paths along the main transmission link, which means that the probability of an outside road user or a relevant object being able to get between the vehicles travelling in a coordinated manner undetected becomes very low.

The focus on the main transmission link means that the medium essential to coordinated driving, that is to say the driving surface, and the area in the underbody of a vehicle are monitored to an appropriate extent.

Another subject of the invention relates to a vehicle having at least one communication apparatus, as has already been described previously. In particular, the communication apparatus is designed and/or suitable for carrying out the method. In particular, the vehicle can be in the form of a multitrack motor vehicle, for example a truck, automobile, bus or the like. Preferably, the vehicle is designed for an automated or semiautomated driving mode. Particularly preferably, the vehicle is designed for convoy travel. The communication apparatus is arranged on an underside of the vehicle, in particular on an underbody and/or axle section of the vehicle, which means that a main transmission link of the transmission path runs beneath the vehicle, in particular beneath the vehicle axles. The vehicle can therefore easily communicate directly with a vehicle that is travelling ahead and/or following.

BRIEF DESCRIPTION OF THE DRAWINGS

Further advantages, effects and embodiments emerge from the accompanying figures and the description thereof, in which.

DETAIL DESCRIPTION

Figure 1:
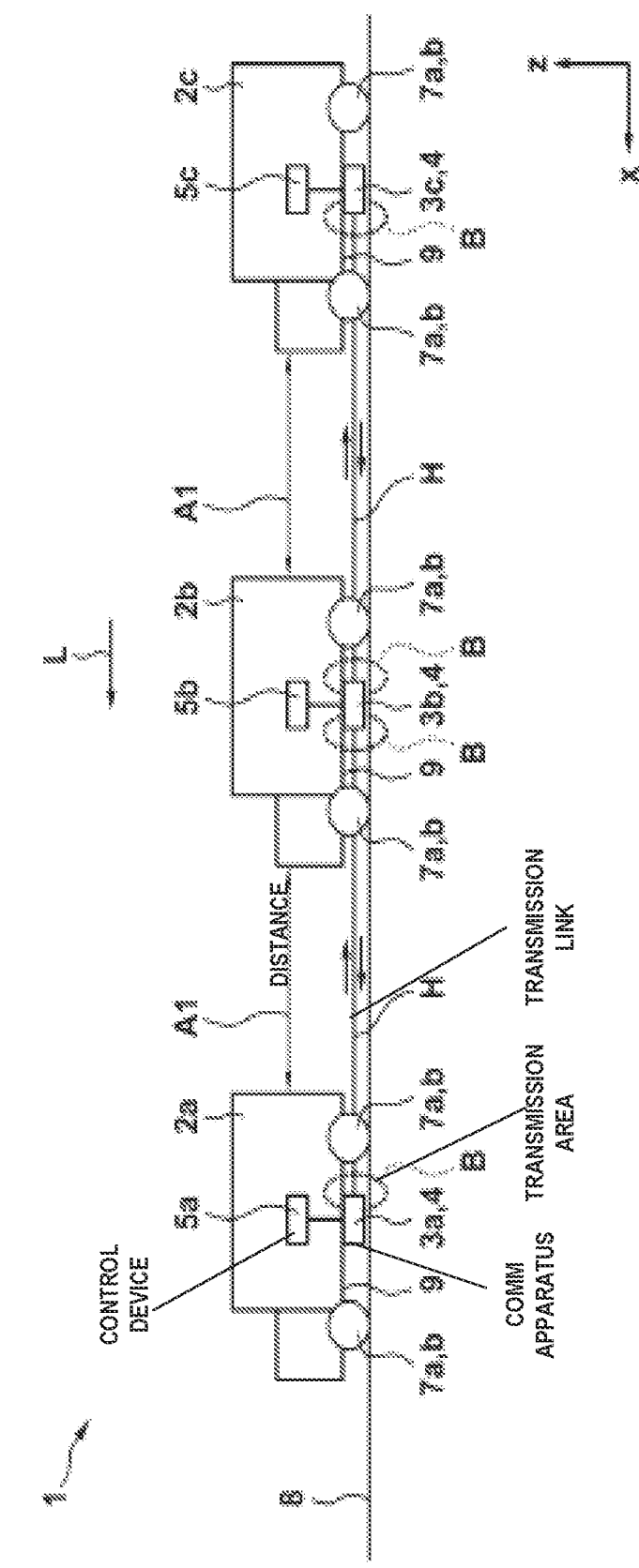
FIG. 1 shows a schematic depiction of a vehicle convoy with multiple vehicles as an exemplary embodiment of the invention.

FIG. 1 shows a schematic depiction of a vehicle convoy 1 with multiple vehicles 2a, b, c, wherein a first vehicle 2a forms a lead vehicle and the other vehicles 2b, c following the first vehicle 2a each form a following vehicle. The following vehicles 2b, c automatically follow the lead vehicle 2a at the same predetermined distance A1 and the same speed. The distance A1 between the vehicles 2a, b, c is ideally a distance of less than or equal to 5 meters. The lead vehicle 2a predefines the speed and the route, with the vehicles 2b, c that are following adapting their behavior in accordance with the lead vehicle 2a.

Both the lead vehicle 2a and the following vehicles 2b, c are each equipped with a communication apparatus 3a, b, c for vehicle-to-vehicle communication. The communication apparatuses 3a, b, c are connected or connectable to one another for signalling purposes to form a communication arrangement 4, in order to communicate with one another and to interchange data, such as e.g. vehicle parameters. Preferably, the communication takes place between respective directly adjacent vehicles, the respective communication apparatus 3a, b, c of a vehicle travelling ahead being designed to transmit data preferably to a vehicle that directly follows said vehicle, the communication apparatus 3a, b, c of which is in turn designed to receive the data. Alternatively or additionally, the information-carrying data can also be conveyed past a vehicle situated in between to a next but one vehicle. In another alternative embodiment, the information-carrying data are transmitted against the direction of travel from a rear vehicle to a vehicle travelling in front thereof. By way of example, the medium used for transmitting the at least one signal can be electromagnetic waves (radio), (ultrasonic) sound waves, (flashes of) light waves or the like.

Furthermore, each of the vehicles 2a, b, c has a control device 5a, b, c, which is designed to take the received data from a vehicle travelling ahead as a basis for controlling driving information recommendations or an automated driving mode of the respective vehicle 2a, b, c. To this end, at least one signal is transmitted along a transmission path between the communication apparatuses 3a, b, c.

In order to realize robust signal transmission, it is known practice to transmit information by means of multiple signals on at least three mutually independent transmission paths and/or media. This allows failure of or interference in a transmission path to be detected by virtue of the information exchanged on the other two transmission paths matching and being different from the information transmitted via the transmission path that is subject to interference. To this end, the communication apparatuses 3a, b, c are usually arranged on a vehicle cab of the vehicle. In particular in the case of vehicles with containers or structures loaded behind the vehicle cab, the transmission path and therefore signal transmission can be adversely affected. Moreover, the communication apparatuses 3a, b, c in such arrangements are susceptible to external sources of interference.

It is therefore proposed that the communication apparatuses 3a, b, c be arranged on the respective vehicle 2a, b, c such that a main transmission link H of the transmission path runs beneath the vehicles 2a, b, c. In this case, the communication apparatuses 3a, b, c are arranged on an underside of the respective vehicle 2a, b, c such that at least 50% of a respective transmission area B of the communication apparatuses 3a, b, c is arranged beneath the associated vehicle 2a, b, c. The transmission area B in this case is intended to be understood as the area in which the communication apparatuses 3a, b, c can send and receive signals. The main transmission link H runs for the most part and/or substantially in a longitudinal direction L of the respective vehicle 2a, b, c. The cavity beneath the vehicles 2a, b, c, which is almost always vacant as determined by the system, can be used to realize reliable signal transmission according to the principle of known waveguides.

A significant advantage of this communication arrangement 3a, b, c is that changes in the road area and approaching objects can easily be identified by surroundings detection. Due to the force of gravity, every approaching object is in contact with the driving surface. If the signals according to the invention hit such an object approaching the vehicles travelling in succession, a portion of the outwardly spreading signals is inevitably reflected by the object and leads in a superimposed manner to changes in the signal that is otherwise used for the communication, which in turn can be identified from a receiver.

Figure 2:
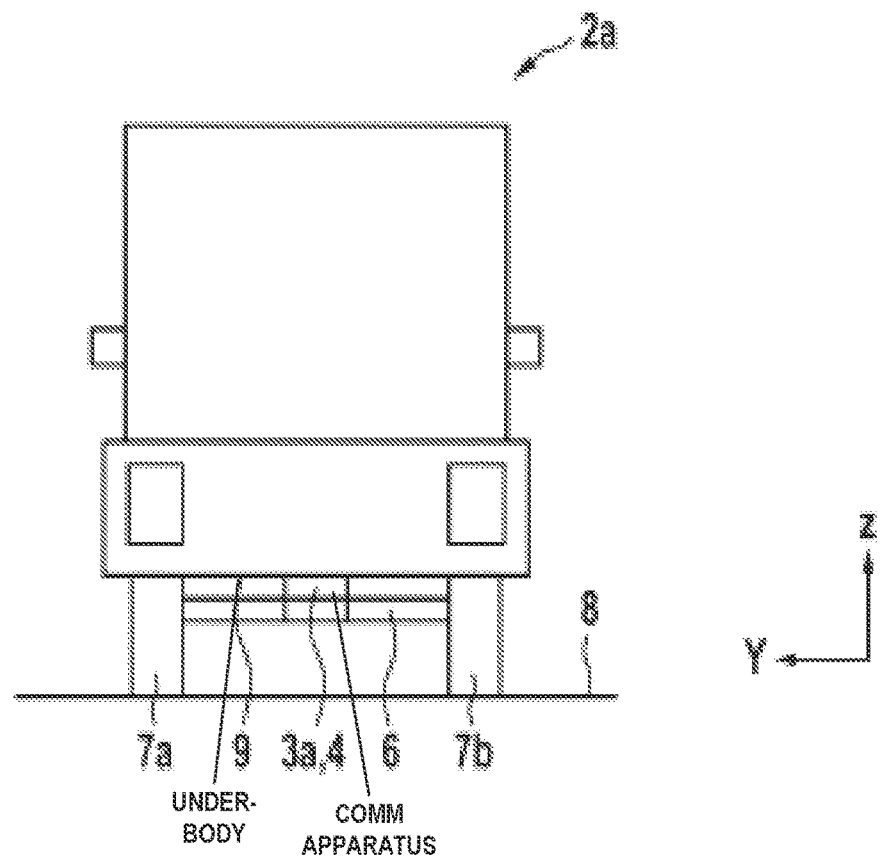
FIG. 2 shows a schematic depiction of a vehicle in FIG. 1.

FIG. 2 shows one of the vehicles 2a, b, c—shown as the vehicle 2a here by way of illustration—in a rear view in the longitudinal direction L. The vehicle 2a has two vehicle wheels 7a, b per axle 6, which are mounted on the axle 6 so as to be able to rotate. In the simplest embodiment, the vehicle 2a, b, c can be in the form of a two-axle vehicle. The main transmission link H runs beneath the vehicle 2a, as already described previously, the main transmission link H being directed substantially in an x direction, defined by the longitudinal direction L, with reference to a vehicle coordinate system. The signal is reflected in a y direction, which is perpendicular to the x direction, by the inner side of the vehicle wheels 7a, b on both sides and in a z direction, which is perpendicular to the x direction and the y direction, firstly by a driving surface 8 and secondly by an underbody 9 of the vehicle 2a. To this end, the communication apparatus 3a is arranged on the underbody 9 of the vehicle 2a.

Specifically, for example the communication apparatus 3a, b, c is arranged on the vehicle central axis in front of the usually at least two axles of a semitrailer trailer in the direction of travel for the purpose of communication with a vehicle 2b, c that is following, which means that the rearwardly directed radiation emissions are provided with a certain degree of further focusing both by virtue of the twin axles at the sides and by virtue of the road 8 and, upwards, by virtue of the trailer housing, and these components conversely provide protection against unwanted incoming radiation.

Furthermore, this arrangement of the communication apparatus 3a, b, c allows communication past a vehicle 2b situated in between to a next but one or further vehicle 2c. As a result, for example important information of interest to many vehicles can be conveyed in a relatively protected transmission area without these signals being widely perceived externally.

In particular, for example a vehicle travelling ahead and in particular the leading vehicle 2a transmits relatively sharply focused light signals with an illustrative beam angle of 2 to 10°, according to the invention in the direction of the vehicles 2b, c that are following, movement information preferably being modulated onto the light signal such that, according to a prior arrangement, if these light signals are not received, the vehicles 2b, c that are following change to a safe state, in particular by braking sharply but with consideration for the traffic that is following.

Another side effect of such communication by means of visible signals is that the coordinated driving is identified publicly for other road users on the basis of the radiated light from the main transmission link into the surroundings.

Figure 3:
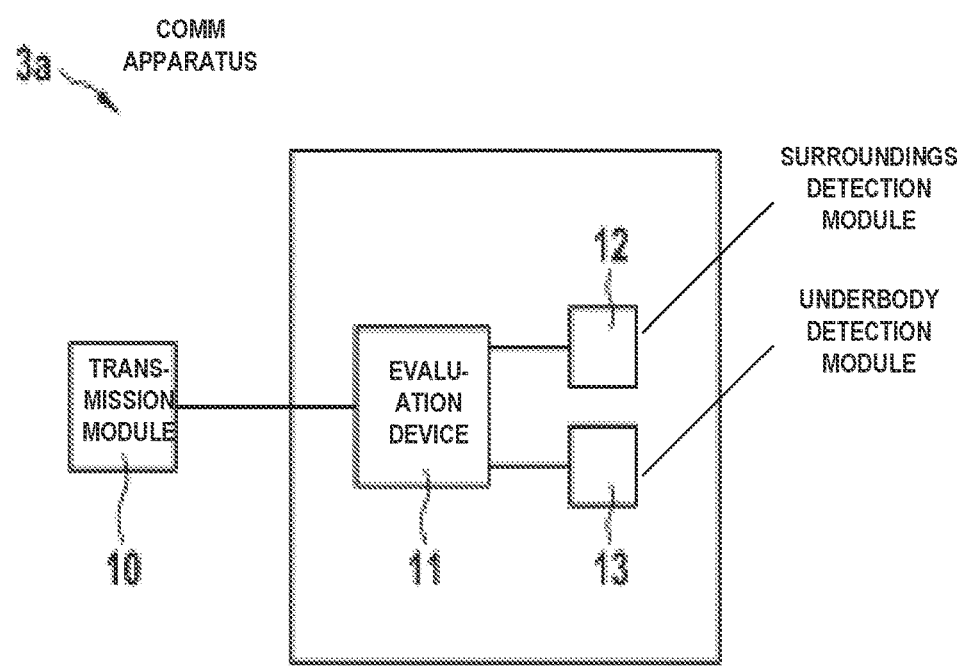
FIG. 3 shows a block diagram of a communication apparatus for the vehicle from FIG. 2.

FIG. 3 shows one of the communication apparatuses 3a in a schematic block diagram as an exemplary embodiment of the invention. The communication apparatus 3a has at least one transmission module 10 designed to receive the signal from an adjacent communication apparatus and/or to transmit the signal to an adjacent communication apparatus.

The communication apparatus 3a has an evaluation device 11 designed to evaluate the signals received via the transmission module 10 and the information in said signals. The evaluation device 11 can be connected to the control device 5a of the vehicle 2a, as depicted in FIG. 1, the evaluation device 11 transmitting the data received for the purpose of controlling the vehicle 2a to the control device 5a in real time, for example.

The communication apparatus 3a has a surroundings detection module 12, the surroundings detection module 12 being designed to take the received and/or transmitted signal as a basis for detecting an object and/or a condition of the driving surface 8 in the surroundings of the associated vehicle 2a. By way of example, the surroundings detection module 12 is designed to take a signal change as a basis for identifying a vehicle that is cutting in and/or a condition of the driving surface 8, such as e.g. precipitation, snow, ruts, road surface quality (grip, etc.) or the like, while travelling.

The communication apparatus 3a moreover has an underbody detection module 13, the underbody detection module 13 being designed to take the received and/or transmitted signal as a basis for detecting an object and/or a condition of the driving surface 8 in an underbody area of the associated vehicle 2a. By way of example, the underbody detection module 13 is designed to take a signal change as a basis for examining the underbody area of the vehicle 2a before starting up in order to ensure that there are no objects and/or people under the vehicle 2a. Moreover, the underbody detection module 13 can be designed to survey the area in front of its own vehicle 2a as well.

Figure 4:
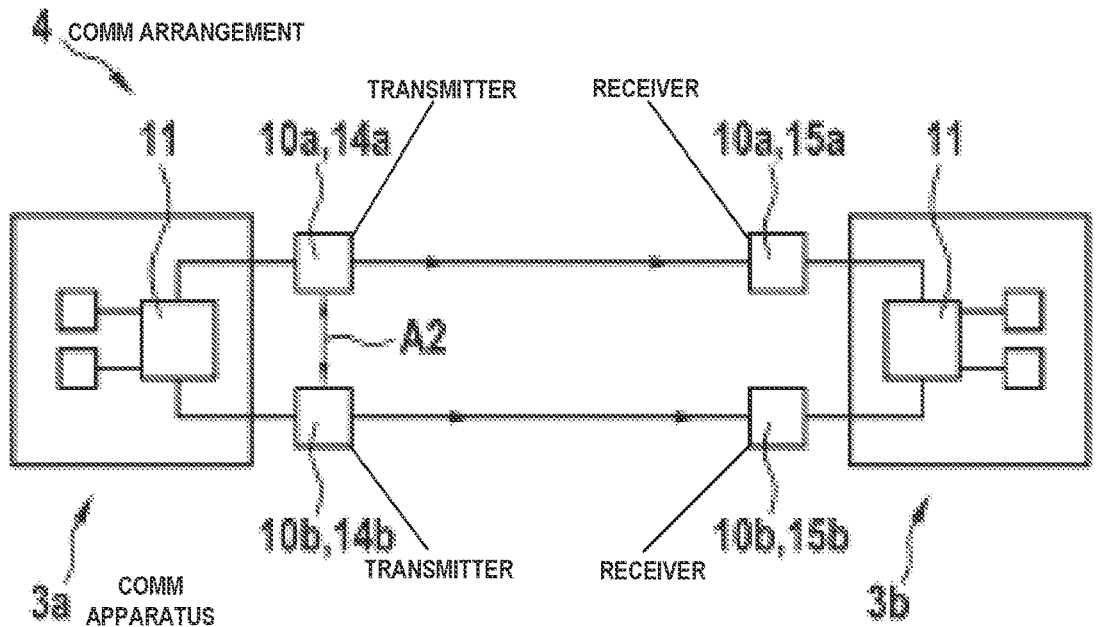
FIG. 4 shows a schematic depiction of a communication arrangement with the communication apparatus from FIG. 3.

FIG. 4 shows the communication arrangement 4 with a first communication apparatus 3a for arrangement on the first vehicle 2a and with a second communication apparatus 3b for arrangement on the second vehicle 2b. The two communication apparatuses 3a, b each have a first and a second transmission module 10a, b, the first and the second transmission module 10a, b of the first communication apparatus 3a each being in the form of a transmitter 14a, b, and the first and the second transmission module 10a, b of the second communication apparatus 3b each being in the form of a receiver 15a, b. The first transmitter 14a is designed to transmit a first signal to the first receiver 15a. The second transmitter 14b is designed to transmit a second signal to the second receiver 15b. The two transmitters 14a, b are arranged at a known distance A2 from one another.

By way of example, the receiver-based evaluation device 11 is designed to determine the position of the first vehicle 2a with respect to the first and second receivers 15a, b on the basis of the received signals. By way of example, the transmitters 14a, b and/or receivers 15a, b can be in the form of so-called corner radars. The signals can be transmitted by means of radio-frequency sonic or ultrasonic signals between the communication apparatuses 3a, b. By way of example, there can be provision for the communication direction to be occasionally rotated between transmitter 14a, b and receiver 15a, b, so that the receiver 15a, b is used for transmission and the transmitter 14a, b is used for reception. In addition, the communication arrangement 4 can be synchronized by means of another medium, e.g. WLAN, mobile radio, SMS.

In a first possible implementation, the two transmitters 14a, b are designed to transmit the first and second signals to the respective receiver 15a, b at proximate times, in particular at the same time. The first and the second signal are distinguishable from one another in this case, the first signal being transmitted e.g. using sound waves and the second signal being transmitted e.g. using electromagnetic waves. In particular, the first and the second signal are fashioned such that they can be separated from one another by the receiver-based evaluation device 11 of the second communication apparatus 3b by means of OFDM (orthogonal frequency-division multiplexing). By way of example, the data can be conveyed as different pulse durations, different orthogonal frequency sets and/or different pulse positions. The evaluation device 11 of the second communication apparatus 3b is moreover designed to take the propagation time differences between transmission and reception of the individual signals as a basis for determining a direction of the vehicle 2a travelling ahead.

In an alternative implementation, there is provision for the two transmitters 14a, b to be designed to transmit the first and second signals at staggered times such that the signals are received by the receivers 15a, b at staggered times in a certain angle range. The sophistication for distinguishing between the signals, e.g. by means of OFDM, is therefore dispensed with. The first and the second signal can for example each be fashioned as an OFDM signal, chirp signal, etc. By way of example, the data can be conveyed as different pulse durations, different (orthogonal) frequency sets/responses and/or different pulse positions. The evaluation device 11 of the second communication apparatus 3b is moreover designed to take the propagation time differences between transmission and reception of the individual signals, which is known to the receivers 15a, b, as a basis for determining a direction of the vehicle 2a travelling ahead.

Figure 5:
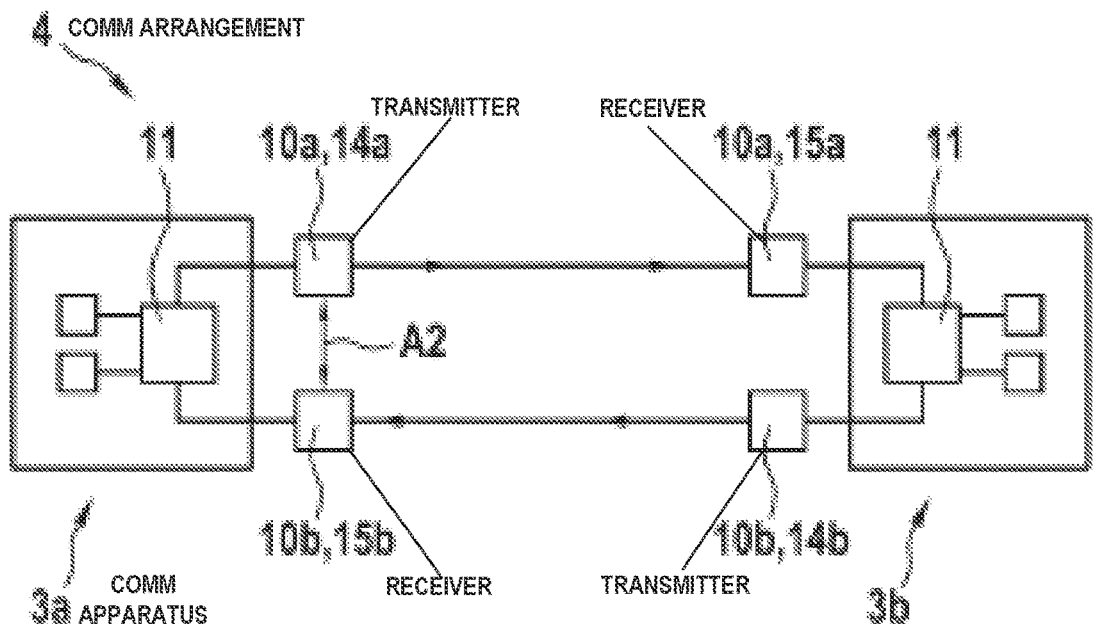
FIG. 5 shows a schematic depiction of an alternative communication arrangement with the communication apparatus from FIG. 3.

FIG. 5 shows the communication arrangement 4 in the same representation as FIG. 4, the first transmission module 10a of the first communication apparatus 3a being in the form of a transmitter 14a and the second transmission module 10b of the first communication apparatus 3a being in the form of a receiver 15b. Accordingly, the first transmission module 10a of the second communication apparatus 3b is in the form of a receiver 15a and the second transmission module 10b of the second communication apparatus 3b is in the form of a transmitter 14b. In this case, the first transmitter 14a is at least intermittently used to transmit signals from the first communication apparatus 3a to the first receiver 15a of the second communication apparatus 3b with a finite propagation time, a signal being transmitted from the second communication apparatus 3b to the second receiver 15b of the first communication apparatus 3a using the second transmitter 14b after a known stipulated time. The evaluation device 11 of the first communication apparatus 11 is designed to take the total transmission time of the propagation-time-dependent transmission as a basis for ascertaining the distance A1 between the vehicles 2a, b or between the communication apparatuses 3a, b.

In principle, the signals can be transmitted between the two communication apparatuses 3a, b by means of sound waves. By way of example, communication can be effected in both directions using the same medium or else using different media, e.g. by virtue of timers of the first and the second communication apparatus 3a, b being synchronized to one another, the first communication apparatus 3a being notified by radio of the time at which the second communication apparatus 3b received the signals, e.g. sound signals, transmitted by the first communication apparatus 3a.

In the same way, a so-called repeated singaround can also be carried out between the two communication apparatuses 3a, b. To this end, prior to an evaluation, the transmission of the signals between the two communication apparatuses 3a, b can be carried out repeatedly. Alternatively, the signals can also be transmitted by way of direction-dependent optical communication, with e.g. a lamp at the rear of the vehicle 2a travelling ahead briefly flashing when the vehicle 2a has been addressed using radar or ultrasound.

The invention claimed is:

1. A method for communication between at least two vehicles (2a, b, c) travelling in succession by means of a communication arrangement (4), wherein the communication arrangement (4) has at least one first communication apparatus (3a) for arrangement on a first vehicle (2a) and at least one second communication apparatus (3b) for arrangement on a second vehicle (2b), the method comprising:
transmitting a signal via a transmission path between the communication apparatuses (3a, b, c),
wherein a main transmission link (H) of the transmission path runs beneath the first and/or second vehicle (2a, b),
wherein at least the first communication apparatus (3a) has a first and a second transmission module (10a, b), the latter spaced apart from the former by a distance (A2),
wherein a first signal is transmitted along a first transmission path between the first transmission module (10a) and the second communication apparatus (3b), and
wherein a second signal is transmitted along a second transmission path between the second transmission module (10b) and the second communication apparatus (3b), the main transmission link (H) of the first and the second transmission path running beneath the at least first and/or second vehicle (2a, b).

2. The method according to claim 1, wherein the main transmission link (H) runs at least approximately in a longitudinal direction (L) of at least one of the vehicles (2a, b, c).

3. The method according to claim 1, wherein the signal is reflected along the main transmission link (H) in a y direction with reference to a vehicle coordinate system by the vehicle wheels (7a, b) on both sides of the at least first and/or second vehicle (2a, b) and/or is reflected in a z direction firstly by a driving surface (8) and secondly by an underbody (9) of the at least first and/or second vehicle (2a, b).

4. The method according to claim 1, wherein at least one of the communication apparatuses (3a, b, c) has a surroundings detection module (12), wherein the signal is taken as a basis for the surroundings detection module (12) to detect an object and/or a condition of a driving surface (8) in the surroundings of the associated vehicle (2a, b, c).

5. The method according to claim 1, wherein at least one of the communication apparatuses (3a, b, c) has an underbody detection module (13), wherein the signal is taken as a basis for the underbody detection module (13) to detect an object and/or a condition of a driving surface (8) in an underbody area of the associated vehicle (2a, b, c).

6. The method according to claim 1, wherein the first signal is transmitted by the first transmission module (10a) and the second signal is transmitted by the second transmission module (10b), to the second communication apparatus (3b), at the same time, wherein the first and the second signal are distinguished from one another by the second communication apparatus (3b) by means of a modulation method.

7. The method according to claim 1, wherein the first signal is transmitted by the first transmission module (10a) and the second signal is transmitted by the second transmission module (10b), to the second communication apparatus (3b), in a manner staggered with respect to one another by an interval of time, wherein the first and the second signal are distinguished from one another by the second communication apparatus (3b) on the basis of the interval of time.

8. The method according to claim 1, wherein a propagation time difference between the transmission and reception of the first and/or second signal is taken as a basis for ascertaining a position and/or a direction of travel of the first vehicle (2a) relative to the second communication apparatus (3b).

9. The method according to claim 1, wherein the first signal is transmitted using sound waves and the second signal is transmitted using electromagnetic waves.

10. The method according to claim 1, wherein the first and/or the second signal is in the form of a chirp signal.

11. The method according to claim 1, wherein the signal is transmitted by the first communication apparatus (3a) to the second communication apparatus (3b) and the signal is transmitted from the second communication apparatus (3b) back to the first communication apparatus (3a) after a stipulated time, wherein a total transmission time for the signal is taken as a basis for ascertaining a distance between the first and the second communication apparatus (3a, b).

12. The method according to claim 1, wherein the signal is synchronized by means of another medium.

13. A vehicle (2a, b, c) having at least one communication apparatus (3a, b, c) for communicating with and/or for determining the movement of at least one vehicle (2a, b, c) travelling ahead and/or following, wherein the communication apparatus (3a, b, c) is designed to transmit a signal to the other vehicle (2a, b, c) via a transmission path and/or to receive a signal from the other vehicle (2a, b, c) via the transmission path, wherein the communication apparatus (3a, b, c) is arranged on an underside of the vehicle (2a, b, c), as a result of which a main transmission link (H) of the transmission path runs beneath the vehicle (2a, b, c), and/or in that the determination of movement is based on the propagation time and/or propagation time differences, wherein at least the first communication apparatus (3a) has a first and a second transmission module (10a, b), the latter spaced apart from the former by a distance (A2), wherein a first signal is transmitted along a first transmission path between the first transmission module (10*a*) and the second communication apparatus (3*b*), and wherein a second signal is transmitted along a second transmission path between the second transmission module (10*b*) and the second communication apparatus (3*b*), the main transmission link (H) of the first and the second transmission path running beneath the at least first and/or second vehicle (2*a, b*).

14. The method according to claim 1, wherein the first and/or the second signal is in the form of an OFDM signal.

* * * * *